UNITED STATES PATENT OFFICE.

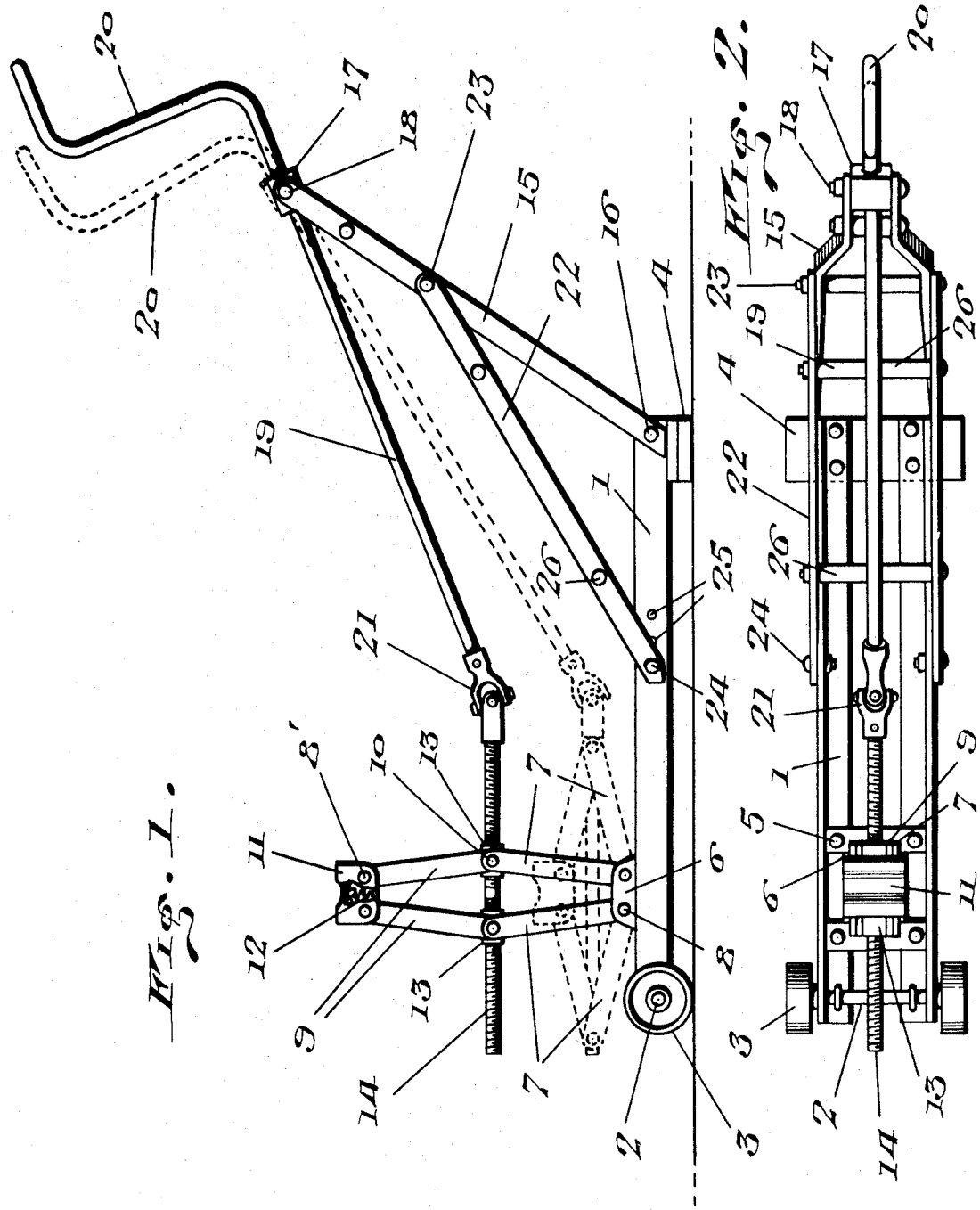

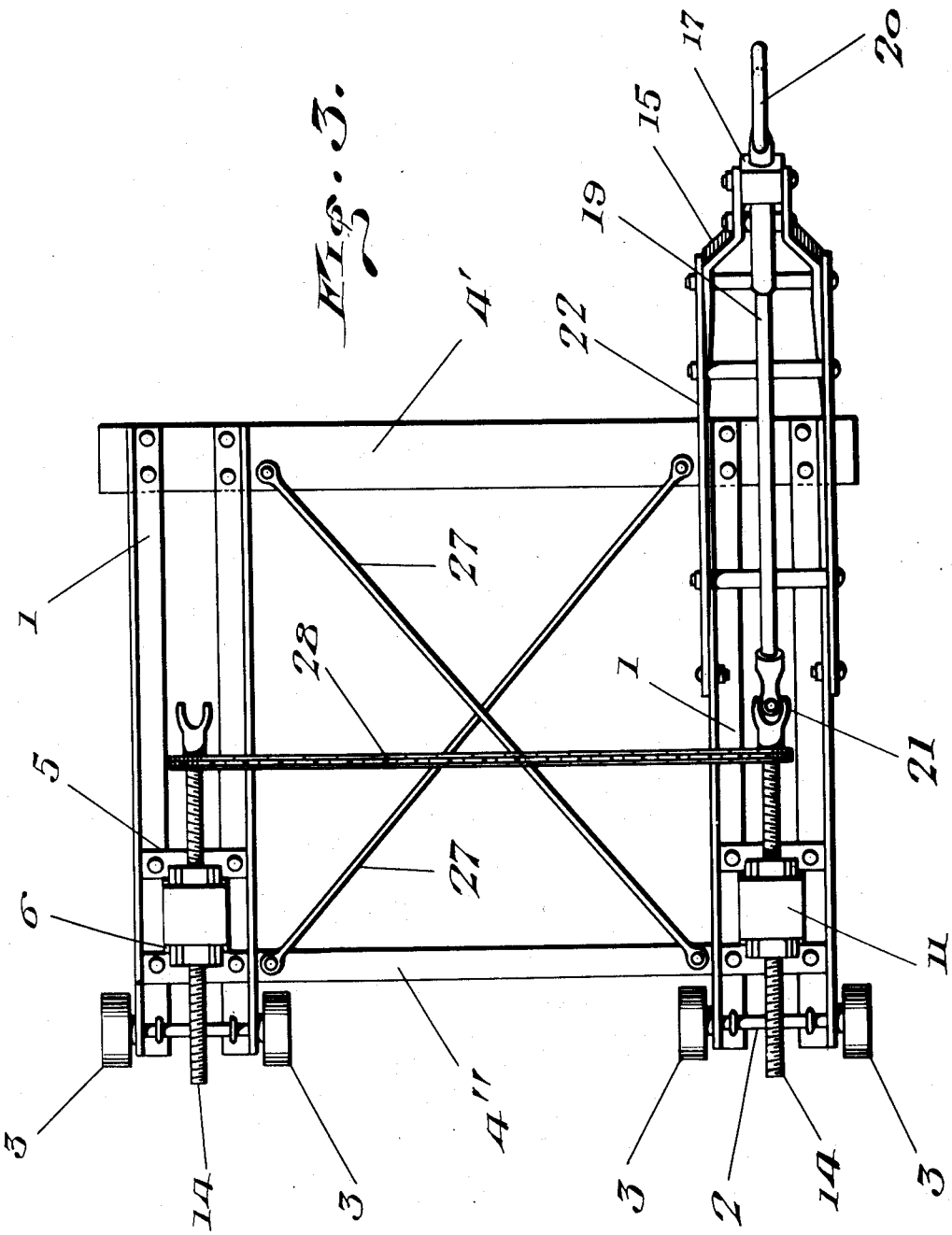

PERCY L. BILLINGSLEY, OF ORLANDO, FLORIDA, ASSIGNOR TO ATLAS MANUFACTURING COMPANY OF ORLANDO, OF ORLANDO, FLORIDA.

LIFTING-JACK.

1,356,033.  Specification of Letters Patent.  Patented Oct. 19, 1920.

Application filed November 18, 1919. Serial No. 338,965.

*To all whom it may concern:*

Be it known that I, PERCY L. BILLINGSLEY, a citizen of the United States, residing at Orlando, in the county of Orange and State of Florida, have invented certain new and useful Improvements in Lifting-Jacks; and I do hereby declare the following to be a full, clear, and exact description of the invention, such as will enable others skilled in the art to which it appertains to make and use the same.

The present invention relates to a lifting jack and aims to provide a novel and improved jack adapted especially for raising the axle or wheel of an automobile or other vehicle, and so constructed and operable that the jack can be readily inserted or moved under the vehicle, and operated conveniently without the necessity of reaching or crawling under the machine.

Another object is the provision of a jack mounted on a truck or platform to be conveniently moved about, and operable from above one end of the platform so that the jack can be conveniently actuated when run under a vehicle.

A further object is to provide such a jack having a novel construction and assemblage of the component parts, whereby it is thoroughly practical and efficient in use, as well as being capable of inexpensive manufacture.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation of the jack.

Fig. 2 is a plan view thereof.

Fig. 3 is a plan view of a double jack using the principles of the jack shown in Figs. 1 and 2.

In carrying out the invention, there is provided an elongated truck or platform having the parallel longitudinal side members 1 through which a transverse axle 2 extends near one end thereof, said axle being mounted on wheels 3 permitting said end of the truck to be conveniently moved about in pushing the jack under a vehicle or drawing same therefrom. The opposite ends of the members 1 are secured on a foot 4 that can rest on the floor or underlying surface after the jack has been slid or rolled to the desired position.

The jack proper is mounted on a base plate 5 secured on the members 1 near the end thereof having wheels, and said plate 5 has upstanding portions 6 between which are pivoted the lower ends of toggle arms 7, as at 8. Upper toggle arms 9 are pivotally connected with the arms 7, as at 10, and a saddle 9 is disposed over and pivoted to the upper ends of the arms 9, as at 8'. The upper ends of the arms 9 are provided with gear teeth 12 for operatively connecting the arms, so that the saddle 11 will move in a vertical line, when the toggle joints 10 are separated and moved toward each other. Said joints 10 have nuts 13 through which a right and left hand screw 14 is threaded, whereby the rotation of said screw in opposite directions will move said joints toward and away from each other for raising and lowering the saddle 11 similar to the lifting jack disclosed in my Patent No. 1,269,153 granted June 11, 1918.

In order that the jack comprising the toggle mechanism can be actuated from a distance, a pair of bars 15 is pivoted as at 16 to those ends of the members 1 opposite to the jack and wheels, and said bars 15 extend upwardly away from the jack. A bearing 17 is trunnioned, as at 18, between the upper ends of the bars 15, and an actuating shaft 19 extends slidably and rotatably through said bearing. The end of the shaft 19 remote from the jack has a crank 20 for rotating said shaft by hand, and the opposite end of the jack is connected by a universal or flexible joint 21 with the corresponding end of the screw 14. Thus, by rotating the crank 20 the screw 14 can be conveniently actuated at a distance from the jack when the jack is inserted under a vehicle, and as the screw 14 raises and lowers, the shaft 19 can tilt to different angles, due to the rocking movement of the bearing 17, said shaft also sliding through said bearing as necessary to accommodate the movement of the parts.

The bars 15 are supported in the desired angular position, by means of a pair of braces 22 having their upper ends pivoted, as at 23, to said bars, and the lower ends of the braces 22 are fastened by bolts 24 or the like to the members 1. Said members have series of apertures 25 to receive the bolts 24, whereby the braces can be adjusted to support the bars 15 in various inclined positions, according to the circumstances. The bars 15 and braces 22 are preferably connected by stays 26 to make the structure more rigid.

With the present jack, it is a convenient matter to slide the jack under the vehicle and then operate it by rotating the crank 20 which will be located at a convenient position for operation, so that it is not necessary for the operator to reach or crawl under the machine. Furthermore, the jack is operated positively, and will be held in the proper position without danger of falling over or moving out of place. This jack can be used to advantage in garages and the like for which it is especially suited.

A number of the jacks can be used for jacking up either the whole vehicle or one axle thereof. In Fig. 3 there is shown a double jack for raising one axle of the vehicle, or one end of the vehicle with one operation. The parts shown in Figs. 1 and 2 are duplicated with the exception of operating means, the members 1 of the two devices being connected by the cross pieces 4' and 4", and being preferably braced as at 27. One of these devices has the actuating means as above described, and the two screws 14 are connected by a sprocket chain 28 or other suitable operative connection, so that when one screw is rotated, this will rotate the other one also, in order that the two jacks will operate simultaneously. In a similar manner two pairs of jacks can be employed for lifting both axles or ends of a vehicle.

Having thus described the invention, what is claimed as new is:—

1. A jack comprising a frame, elevating means mounted on said frame, a rotatable member for operating said elevating means, an operating shaft having a flexible connection with said member, a bearing for said shaft, and means supporting said bearing from the frame for adjustment to raise and lower said bearing and shaft and for the swinging movement of the bearing to different angles with said shaft.

2. A jack comprising a frame, elevating means mounted on said frame, a rotatable member for operating said elevating means, adjustable supporting means mounted on said frame, an operating shaft having a flexible connection with said member, and a bearing for said shaft carried by said supporting means to be raised and lowered with said means and arranged to permit of the sliding and swinging movement of said shaft.

3. A jack comprising a truck frame, elevating means mounted on said frame near one end thereof, a rotatable member for operating said elevating means carried by said means, an operating shaft having a flexible connection with said member and having means at it opposite end for manually turning same, and means carried by the frame near its opposite end for supporting said shaft for movement with said member.

4. A jack comprising a truck frame, a toggle device mounted thereon, a screw carried by said device for actuating it, an operating shaft having a universal joint connection with said screw, and a rocking bearing supported from said frame through which said shaft extends for rotary and sliding movements.

5. A jack comprising a truck frame, a toggle device mounted thereon near one end thereof and having lower and upper toggle arms with joints between them, and a right and left hand horizontal screw threadedly connected with said joints, supporting means extending upwardly from the frame at its opposite end, a bearing trunnioned in said supporting means, and an operating shaft extending through said bearing for sliding and rotary movements and having a universal joint connection at one end with said screw, and operating means at its opposite end.

6. A jack comprising a truck frame, a toggle device mounted thereon, a screw carried by said device for actuating it, supporting bars pivotally connected with the frame and extending upwardly therefrom, a brace adjustably connecting said bars and frame, a bearing trunnioned between said bars, and a shaft slidable and rotatable in said bearing and having a universal joint connection with said screw.

In testimony whereof I have signed my name to this specification in the presence of two subscribing witnesses.

PERCY L. BILLINGSLEY.

Witnesses:
A. P. FOTHERGILL,
WM. G. GEIER.